(12) United States Patent
Alton (10) Patent No.: US 7,036,417 B2
(45) Date of Patent: May 2, 2006

(54) BANDSAW BLADE WITH CUTTING EXTENSIONS

(76) Inventor: William George Alton, 445 Blackberry Dr., Monroeville, PA (US) 15146

( * ) Notice: Subject to any disclaimer, the term of this patent is extended or adjusted under 35 U.S.C. 154(b) by 465 days.

(21) Appl. No.: 10/008,820

(22) Filed: Nov. 13, 2001

(65) Prior Publication Data

US 2003/0089215 A1     May 15, 2003

(51) Int. Cl.
    *B27B 33/02* (2006.01)
(52) U.S. Cl. ............................ 83/846; 83/847; 83/850; 83/851
(58) Field of Classification Search .................. 83/846, 83/847, 848, 849, 850, 851, 852
    See application file for complete search history.

(56) References Cited

U.S. PATENT DOCUMENTS

| | | | | |
|---|---|---|---|---|
| 79,099 | A | * | 6/1868 | Barry ........................... 83/845 |
| 292,809 | A | * | 2/1884 | Harris .......................... 83/845 |
| 540,065 | A | * | 5/1895 | Krieger ........................ 83/841 |
| 835,226 | A | * | 11/1906 | Oakes .......................... 83/848 |
| 1,653,265 | A | * | 12/1927 | Foerster ....................... 83/845 |
| 2,994,350 | A | * | 8/1961 | Lundberg ..................... 83/845 |
| 3,295,400 | A | * | 1/1967 | Anderson ..................... 83/855 |
| 3,371,393 | A | * | 3/1968 | Grassmann ................... 83/851 |
| 4,236,432 | A | * | 12/1980 | Kawakami et al. ........... 83/848 |
| 4,640,172 | A | * | 2/1987 | Kullmann et al. ............ 83/851 |
| 4,646,606 | A | * | 3/1987 | Bonac .......................... 83/839 |
| 4,727,788 | A | | 3/1988 | Yoshida et al. |
| 4,947,721 | A | * | 8/1990 | Anderson ..................... 83/843 |
| 5,410,935 | A | | 5/1995 | Holston et al. |
| 5,425,296 | A | | 6/1995 | Kullmann et al. |
| 5,477,763 | A | * | 12/1995 | Kullman ....................... 83/846 |
| 5,606,900 | A | | 3/1997 | Stoddard |
| 5,803,678 | A | | 9/1998 | Korb et al. |
| 5,832,803 | A | | 11/1998 | Hayden, Sr. |
| 6,119,571 | A | * | 9/2000 | Hayden, Sr. .................. 83/848 |
| 6,158,324 | A | | 12/2000 | Kullmann et al. |
| D438,549 | S | * | 3/2001 | Tsujimoto .................... D15/134 |
| 6,220,139 | B1 | * | 4/2001 | Kobayashi et al. ........... 83/851 |
| 6,220,140 | B1 | | 4/2001 | Hellebergh |
| 6,276,248 | B1 | | 8/2001 | Cranna |
| 6,276,249 | B1 | | 8/2001 | Handschuh et al. |
| 6,505,537 | B1 | * | 1/2003 | Vöge ............................ 83/848 |
| 6,520,722 | B1 | * | 2/2003 | Hopper et al. ................ 83/846 |

FOREIGN PATENT DOCUMENTS

| | | | | |
|---|---|---|---|---|
| GB | 426498 | * | 4/1935 | .................. 83/851 |
| IT | 597203 | * | 8/1959 | .................. 83/852 |

* cited by examiner

*Primary Examiner*—Allan N. Shoap
*Assistant Examiner*—Jason Prone
(74) *Attorney, Agent, or Firm*—David C. Jenkins; Eckert Seamans Cherin & Mellott, LLC (57) ABSTRACT

A saw blade that includes a bandsaw body and a plurality of unset teeth having a generally uniform height. The teeth are disposed on the bandsaw body. At least some of the teeth have a cutting extension that extends above the uniform height of the teeth.

17 Claims, 7 Drawing Sheets

BANDSAW BLADE WITH CUTTING EXTENSIONS

BACKGROUND OF THE INVENTION

1. Field of the Invention

This invention relates to a bandsaw blade and, more specifically, to a bandsaw having teeth with bodies of a generally uniform height and wherein at least some of the teeth have a cutting extension extending above the height of the teeth.

2. Background Information

Bandsaw blades include a flat body having a plurality of teeth extending therefrom. Each tooth has a height, extending above the body, a width, which is perpendicular to the longitudinal axis of the body, and a length, extending along the longitudinal axis of the body. Typically, the bandsaw body is made from a material such as steel and a carbide tip, which includes the cutting edge, is coupled to the tip of each tooth. The bandsaw blade moves in the longitudinal direction of the body in a single direction, hereinafter "the cutting path." Each tooth also has a cutting edge located, generally, at the greatest height on the tooth. As the moving bandsaw blade comes into contact with a workpiece, the teeth cut a channel in the workpiece.

A bandsaw blade is more efficient if the load due to cutting forces, hereinafter "cutting load," is distributed across a group of teeth. As used herein, a "group" of teeth is a pattern of teeth that is repeated along the length of the bandsaw blade. To improve the efficiency of the bandsaw blade, teeth having different shapes are disposed on the body in groups. The groups each have the teeth of different shapes disposed in the same pattern. Thus, the groups are described as "repeating" groups. Each tooth in a group is structured to cut a different portion of the channel in the workpiece. In prior art bandsaw blades the teeth were structured to cut a different portion of the channel in one of two ways; set teeth, which are each tilted differently, or unset teeth which have variations in the tooth height and width.

Figure 1:
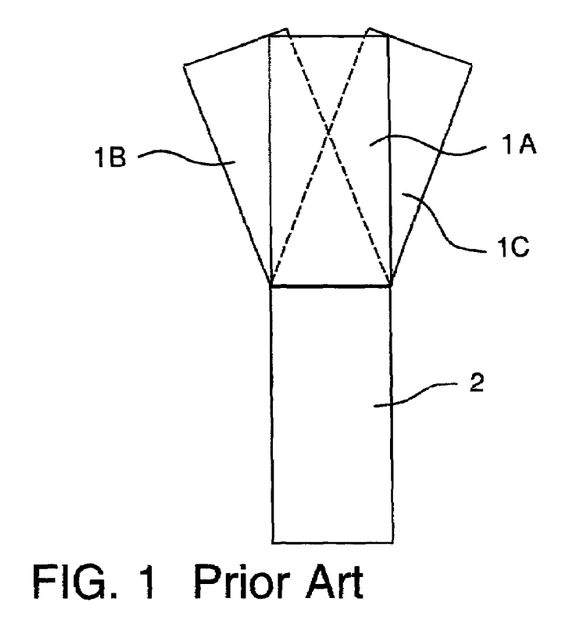
FIG. 1 is a front view of a prior art bandsaw blade having set teeth.

The first means of distributing the cutting load is to have set teeth. That is, as shown in FIG. 1, some of the generally rectangular teeth in a group are set, or tilted, to the left or right of the cutting path. Thus, assuming a group of three teeth, each tooth 1A, 1B, 1C is disposed on a body 2. The first tooth 1A in the group is un-set, that is, not tilted. The first tooth 1A in the group cuts the middle portion of the channel. The second tooth 1B is tilted to the left. As such, the second tooth 1B left edge cuts the left portion of the channel. At the same time, the right edge of the second tooth 1B, which, because of the tilt, is higher than the first tooth, cuts within the center of the channel. The third tooth 1C is tilted to the right. The right edge of the third tooth 1C cuts the right portion of the channel while the left edge of the third tooth 1C also cuts within the center portion of the channel. As such the cutting load is distributed over the three teeth in the group. Of course, there may be more than three teeth in the group and various patterns of set teeth.

Figure 2:
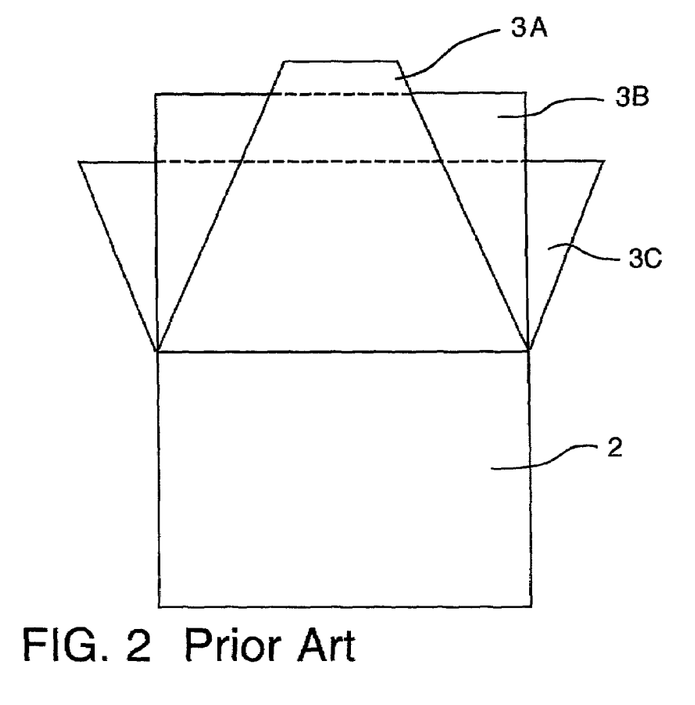
FIG. 2 is a front view of a prior art bandsaw blade having unset teeth.

The second means of distributing the cutting load is to have a group of un-set teeth each with an inverse height-width ratio. That is, as shown in FIG. 2, a tooth may be tall and thin 3A, short and wide 3C, or somewhere in between 3B. Working again with a three tooth group for example, the first tooth 3A is the tallest, that is, extending the greatest distance from body 2, and has a cutting edge that is ⅓ the width of the channel. Thus, the first tooth 3A cuts the middle ⅓ of the channel. The second tooth 3B is shorter than the first tooth and is ⅔ the width of the channel. As such, the second tooth 3B widens the channel initially cut by the first tooth 3A. That is, the middle portion of the second tooth 3B travels in the groove cut by the first tooth 3A. The outer portions of the second tooth 3B, each of which is ⅙ the width of the channel, each cut a portion of the channel in the workpiece. Finally, the third tooth 3C is the shortest tooth and is as wide as the channel. As the first tooth 3A cuts the middle third portion of the channel and the second tooth 3B cuts an additional one sixth portion of the channel on each side (⅙+⅙=⅓), of channel cut by the first cut by the first tooth 3A, the third tooth 3C only has to cut the outer most portion on both sides of the channel. The portion cut by each outer edge of the third tooth 3C is one sixth the width of the channel (⅙+⅙=⅓). Thus, each tooth carries an equal portion of the cutting load. Again, this structure can be used with more than three teeth in a group.

Additionally, a bandsaw blade may groups of teeth that include sub groups. That is, a primary group may have two or more sub-groups of teeth. For example, a primary group may have a first sub-group of three teeth followed by a second sub-group of 5 teeth. Thus, the primary group is repeated along the bandsaw blade body in a 3-tooth, 5-tooth pattern.

Both of these means of distributing the cutting load suffer from disadvantages. For example, the cutting load on a set tooth creates a force that acts in a direction perpendicular to the angle of the set. That is, while in use, the set teeth are biased into alignment with the bandsaw body. This stress causes the bandsaw blade to wear out before the useful life of the cutting edges is exhausted. Unset teeth having different heights may experience different loads if the workpiece is fed too quickly. That is, if the workpiece is fed too rapidly, the taller teeth will be forced to cut a deeper chip than the shorter teeth. Thus, although the cutting edges on each tooth have an equal width, the cutting load is still different on each tooth. This leads to premature wear on the teeth carrying the greater load.

There is, therefore, a need for a bandsaw blade that evenly distributes the cutting load across all cutting teeth.

There is a further need for a bandsaw blade that is compatible with existing equipment.

SUMMARY OF THE INVENTION

These needs, and others, are met by the disclosed invention which provides a bandsaw blade having un-set teeth, each tooth having a cutting extension. The cutting extension extends beyond the height of the tooth body. Ad individual cutting extension has a width less than the width of the tooth body, but the total width of the cutting extensions in a group of teeth is the same as, or greater than, the width of the teeth. The cutting extensions a positioned on the teeth in a group so that outer edges of the one cutting extension are generally aligned with the outer edge of a cutting extension on another tooth or aligned with the outer edge of the tooth. Thus, the cutting extensions are not aligned. As used herein, "aligned" means aligned as viewed along the longitudinal axis of the bandsaw blade.

Preferably, the cutting extensions within a group are each the same width, e.g., ⅓ the width of the tooth. The cutting extensions within a group of teeth are positioned so that each tooth is located over a different portion of each tooth in the group. Thus, in a three-tooth group, each extension is ⅓ the width of the tooth. One extension is located over the left most third of one tooth, a second extension is coated over the center third of another tooth, and a third extension is located over the right third of the remaining tooth. Generally, if there are "n" teeth in a group, each tooth has an extension that is $1/n^{th}$ the width of the tooth.

Alternatively, a single tooth may have more than one extension so long as the total width of the sum of the widths of the extensions is generally equal to or greater than the width of the tooth body. For example, in a two-tooth group, the first tooth may have a centrally located extension that is ½ the width of the tooth body. The second tooth in the group has two extensions, each being about ¼ the width of the tooth body, located adjacent to the outer edges of the tooth. Thus, the total width of the extensions, ½+¼+¼, is about the same as the width of the tooth and the extensions are not aligned with each other.

As such, in either embodiment, the cutting load on each tooth is about the same.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 3:
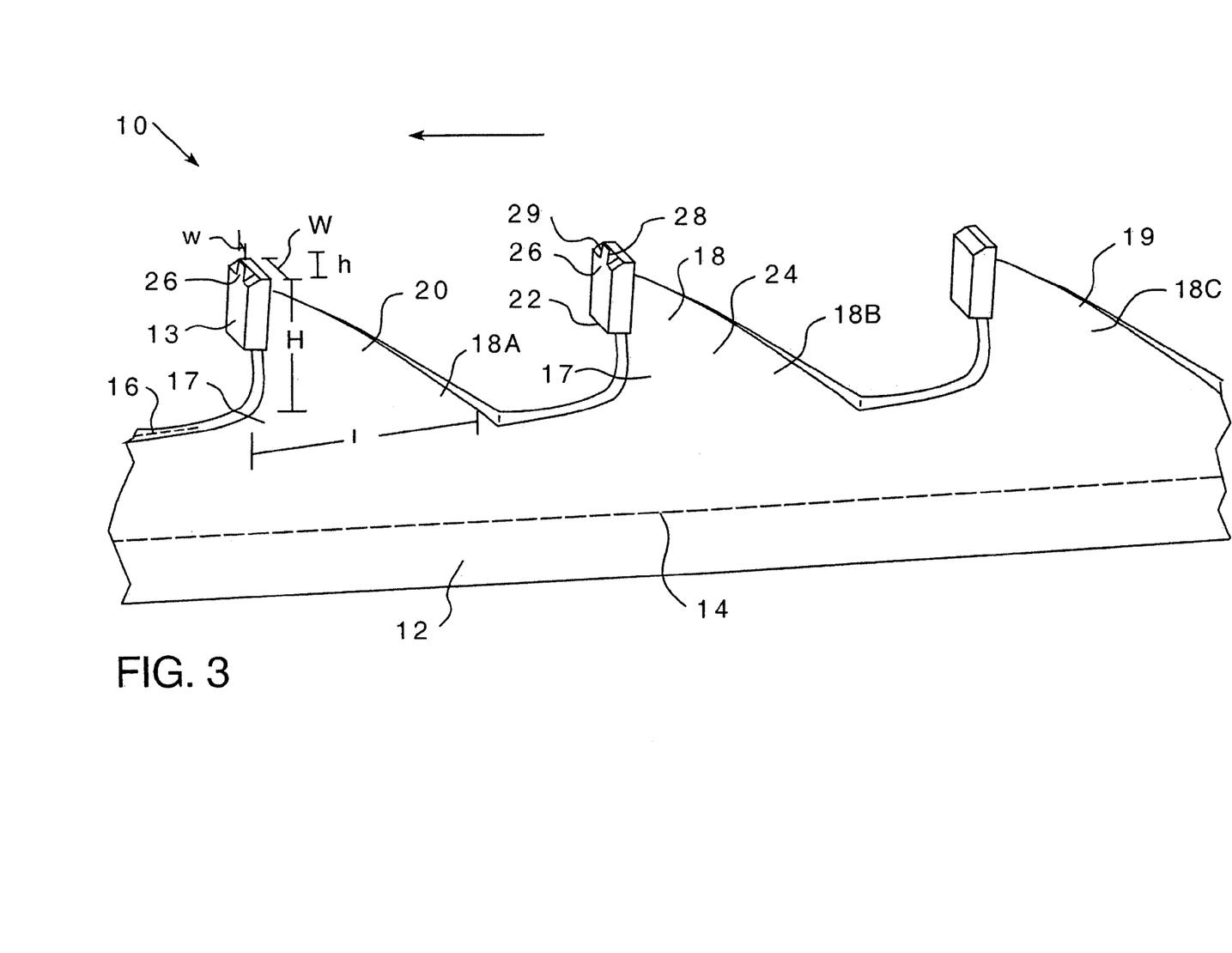
FIG. 3 is an isometric view of a bandsaw blade incorporating the present invention

As shown in FIG. 3 a bandsaw blade 10 includes an elongated body 12 having a longitudinal axis 14, a center line 16, and a plurality of unset teeth 18 extending therefrom. The bandsaw blade 10 travels in a cutting path indicated by the arrow. As will be described fully below, the teeth 18A, 18B are disposed in repeating groups along the elongated body 12. The bandsaw body 12 is, typically, made from a metal such as steel. A carbide tip 13 having a cutting edge is usually attached to the bandsaw body 12 at the end of each tooth. However, as the bandsaw body 12 may have integral cutting edge, the carbide tip 13 shall hereinafter be described as part of a tooth body 20. Each tooth body 20 extends from the blade body 12. Each tooth body 20 has a height, identified by the letter "H", a length, "L" and a width "W". The tooth body 20 height and width are shown more clearly in FIGS. 6A–6C, described below. A tooth 18A, 18B is preferably between about 0.05 and 0.20 inches wide. The width, "W," indicates the maximum width of the tooth body lead edge 22 in the cutting path. Each tooth body 20 is about the same height. As shown, the tooth body 20 may have a rear edge 24 that is more narrow than the lead edge 22. The teeth 18 may be cutting teeth 17, having a cutting extension 26, described below, or a rake tooth 19 that does not have a cutting extension.

Each tooth body 20 includes a cutting extension 26. Each cutting extension 26 extends above the height "H" of the tooth body 20. The height of the cutting extension 26 is indicated by the letter "h" on FIGS. 3 and 6A–6C. Each cutting extension 26 has about the same height. The height of each cutting extension 26 is preferably between about 0.001 to 0.01 inches. Each cutting extension 26 has a width, "w," that is less than the width "W" of the tooth body 20. Preferably, the width of the cutting extension 26 is based on the number of cutting teeth 17 in a group of teeth. That is, the width of the cutting extension 26 is about equal to the width of the tooth body 20 divided by the number of cutting teeth 17 in a group. Expressed mathematically, where "n" represents the number of cutting teeth 17 in a group, w represents the width of the cutting extension 26, and W represents the width of the tooth body:

$$w = W/n$$

Thus, the sum of the widths of the cutting extensions 26 in a group is about equal to the width of the tooth body 20. Additionally, the width of each cutting extension 26 in the group is generally the same as the width of the other cutting extensions 26 in the group.

In an embodiment where the width of a single cutting extension 26 is equal to the width of the tooth body 20 divided by the number of teeth in a group, the cutting extensions 26 are preferably disposed so that no significant portion of two different cutting extensions 26 in a group are aligned with each other. That is, each cutting extension 26 has two outer sides 28, 29 that extend in a direction generally similar to the longitudinal axis 14 of the bandsaw body 12 and, while no two cutting extensions 26 in a group are aligned with each other, each cutting extension outer side 28, 29 is substantially aligned with the outer side 28, 29 of a cutting extension on another tooth body 20 in the group, or substantially aligned with the outer edge of the tooth body 20. Thus, when viewed from along the longitudinal axis of the bandsaw blade body 14, the cutting extensions 26 extend across the entire width of the tooth body 20 and no significant portion of one cutting extension 26 in the group is substantially aligned with another cutting extension 26 in the group.

The bandsaw body 12 has a length sufficient to have a plurality of teeth bodies 20 disposed thereon. As discussed above, the teeth bodies 20 are disposed on the bandsaw body 12 in groups of teeth 30, 40, 50, wherein the pattern of the location of the cutting extension 26 on a series of teeth bodies 20 in the group are repeated in each group. A group of teeth must have two or more tooth bodies 20 in each group. As shown in FIGS. 4A–4C, 5A–5C, and 6A–6C, in the preferred embodiments, a first group 30 includes a series of three teeth 31A, 31B, 31C, a second group 40 includes a series of four teeth 41A, 41B, 41C, 41D, and a third group includes a series of five teeth 51A, 51B, 51C, 51D, 51E.

Figure 4A:
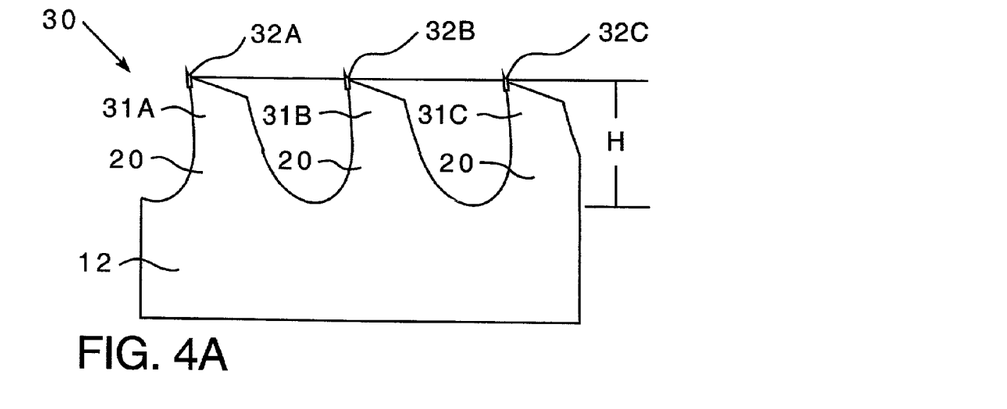
FIG. 4A is a side view of a bandsaw blade having extensions in a three-tooth group.
Figure 5A:
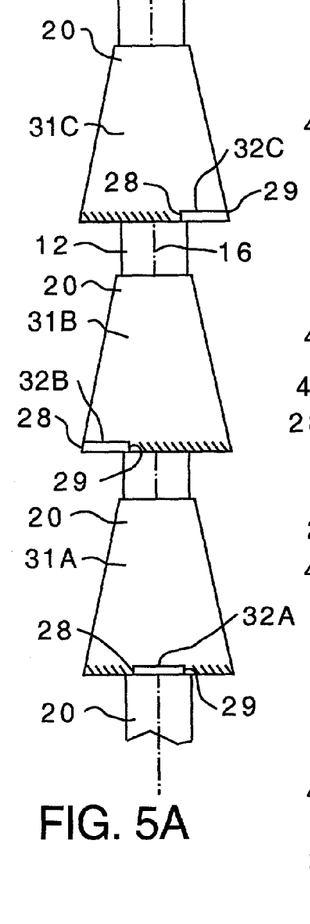
FIG. 5A is a top view of the bandsaw blade in FIG. 4A.
Figure 6A:
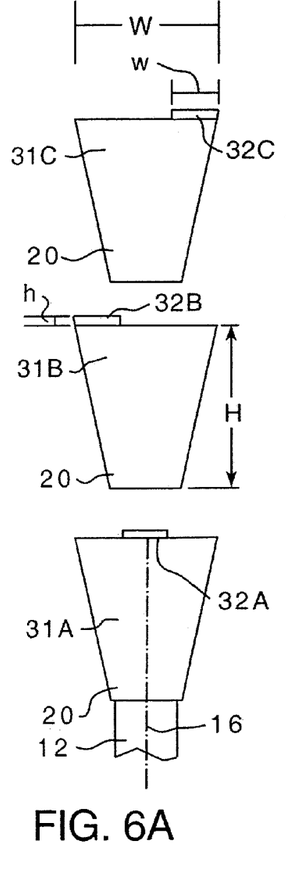
FIG. 6A is a schematic front view of the in FIG. 4A.

Thus, referring to FIGS. 4A, 5A and 6A, there is a bandsaw body 12 having a first group 30 of three cutting teeth including a first group first tooth 31A, a first group second tooth 31B, and a first group third tooth 31C. Each tooth 31A, 31B, 31C has a cutting extension 32A, 32B, 32C. Each cutting extension 32A, 32B, 32C has a width that is about one third the width of the tooth body 20. The first group first tooth cutting extension 32A is centrally located over the bandsaw body centerline 16. The first group second tooth cutting extension 32B is disposed adjacent to an outer side of the tooth body 20 so that one cutting extension outer side 28 is aligned with the tooth body 20 outer side and the other outer side 29 of the first group second tooth cutting extension 32B is aligned with an outer side 28 of the first group first tooth cutting extension 32A. As shown, the first group second tooth cutting extension 32B is disposed on the left side of the tooth body 20. The first group third tooth cutting extension 32C is disposed adjacent to the other outer side of the tooth body 20 so that one cutting extension outer side 29 is aligned with the tooth body 20 outer side and the other outer side 28 of the first group third tooth cutting extension 32C is aligned with an outer side 29 of the first group first tooth cutting extension 32A. As shown, the first group third tooth cutting extension 32C is disposed on the right side of the tooth body 20.

In operation, the saw blade 10 cuts a channel having a width about equal to the width of the tooth body 20. With reference to the three-tooth group shown in FIGS. 4A, 5A, and 6A, the first group first tooth cutting extension 32A cuts the center third of the channel. The first group second tooth cutting extension 32B cuts the left third of the channel. The first group third tooth cutting extension 32C cuts the right third of the channel. Thus, because no two cutting extensions in a group are aligned, and because the sum of the widths of the cutting extensions equals, or is greater than, the width of the tooth body 20, the cutting extension 32A, 32B, 32C in the first group cut a channel having at least the width of the tooth body 20.

Figure 4B:
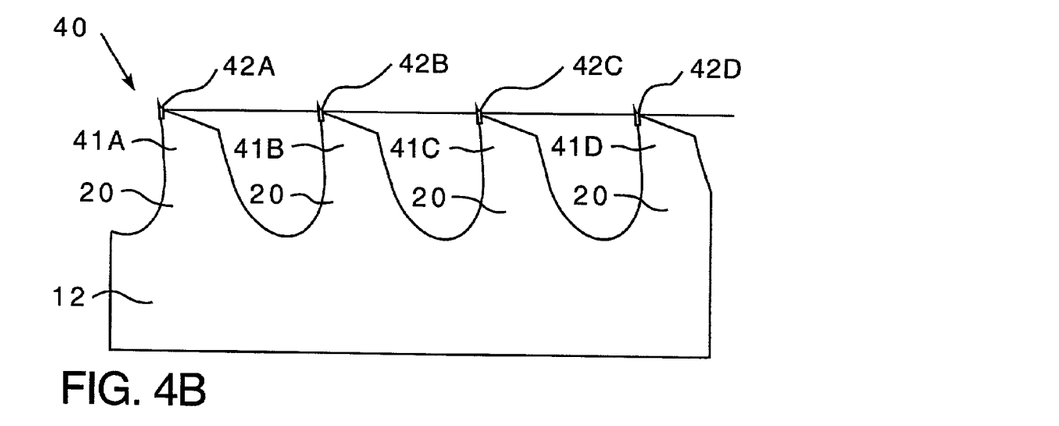
FIG. 4B is a side view of a bandsaw blade having extensions in four-tooth group.
Figure 5B:
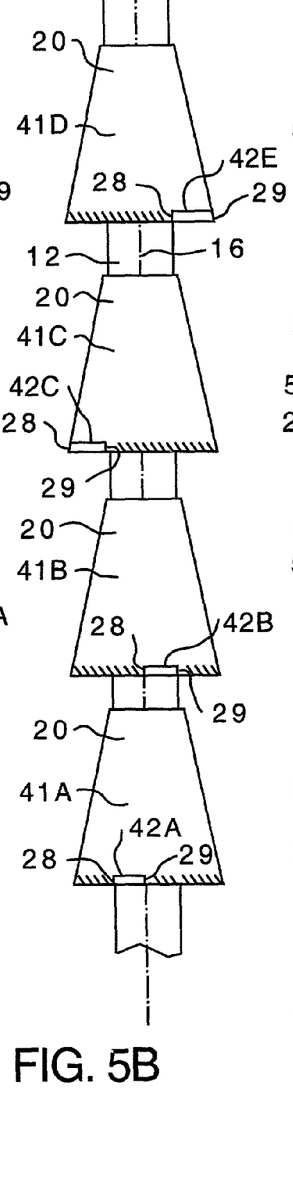
FIG. 5B is a top view of the bandsaw blade in FIG. 4B.
Figure 6B:
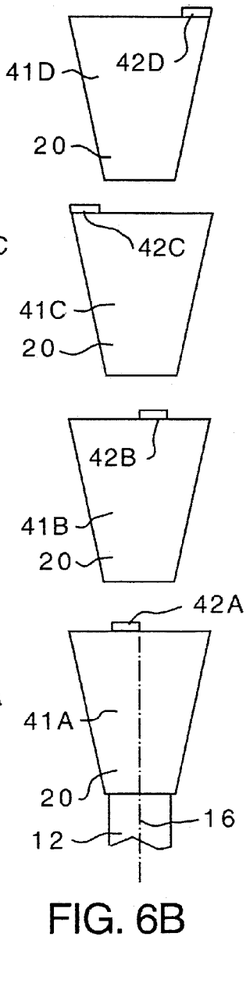
FIG. 6B is a schematic front view of the in FIG. 4B.

Referring to FIGS. 4B, 5B and 6B, there is a bandsaw body 12 having a second group 40 of four cutting teeth including a second group first tooth 41A, a second group second tooth 41B, a second group third tooth 41C, and a second group fourth tooth 41D. Each tooth 41A, 41B, 41C, 41D has a cutting extension 42A, 42B, 42C, 42D. Each cutting extension 42A, 42B, 42C, 42D has a width that is about one fourth the width of the tooth body 20. The second group first tooth cutting extension 42A is disposed with one outer side 29 aligned with the bandsaw body centerline 16. The second group first tooth cutting extension 42A extends to the left of the bandsaw body centerline 16. The second group second tooth cutting extension 42B is disposed with one outer side 28 aligned with the bandsaw body centerline 16. The second group second tooth cutting extension 42B extends to the right of the bandsaw body centerline 16. Thus, one outer edge 28 of the second group second tooth cutting extension 42B is aligned with one outer edge 29 of the second group first tooth cutting extension 42A. The second group third cutting extension 42C is disposed adjacent to an outer side of the tooth body 20 so that one cutting extension outer side 28 is aligned with the tooth body 20 outer side and the other outer side 29 of the second group second tooth cutting extension 42B is aligned with an outer side 28 of either of the second group first or second tooth cutting extension 42A, 42B. As shown, the second group second tooth cutting extension 42C is disposed on the left side of the tooth body 20. The second group fourth tooth cutting extension 42D is disposed adjacent to the other outer side of the tooth body 20 so that one cutting extension outer side 29 is aligned with the tooth body 20 outer side and the other outer side 28 the second group fourth tooth cutting extension 42D is aligned with an outer side 29 of the either of the second group first or second tooth cutting extension 42A, 42B. As shown, the second group fourth tooth cutting extension 42D is disposed on the right side of the tooth body 20.

Figure 4C:
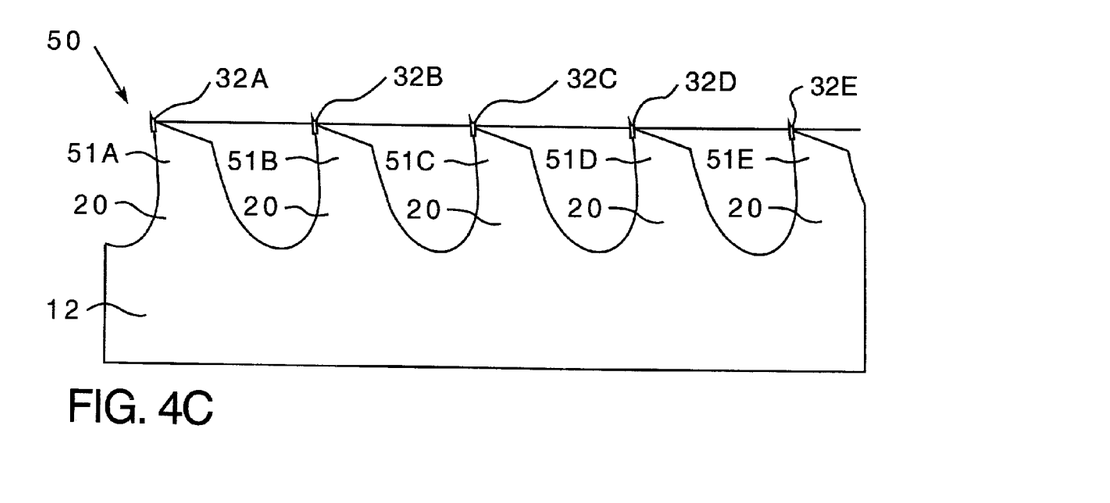
FIG. 4C is a side view of a bandsaw blade having extensions in five-tooth group.
Figure 5C:
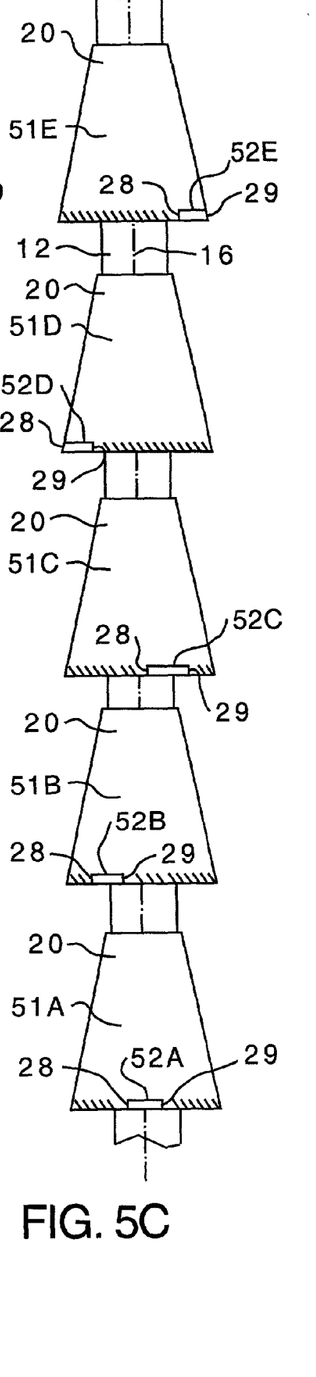
FIG. 5C is a top view of the bandsaw blade in FIG. 4C.
Figure 6C:
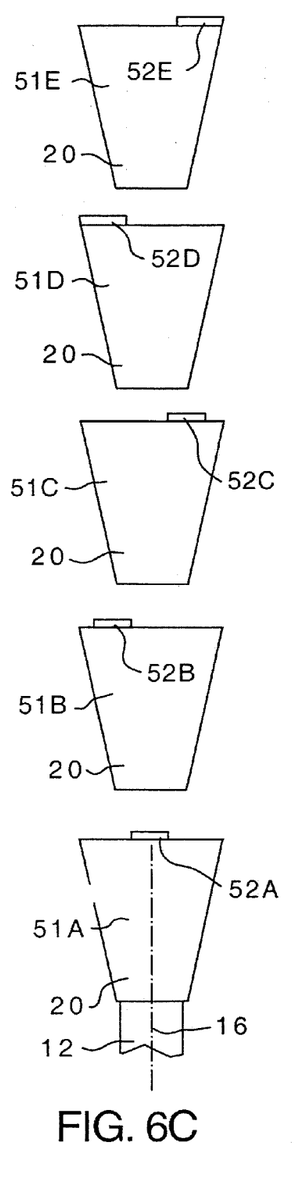
FIG. 6C is a schematic front view of the in FIG. 4C.

Referring to FIGS. 4C, 5C and 6C, there is a bandsaw body 12 having a third group 50 of five cutting teeth including a third group first tooth 51A, a third group second tooth 51B, a third group third tooth 51C, a third group fourth tooth 51D, and a third group fifth tooth 51E. Each third group tooth 51A, 51B, 51C, 51D, 51E has a cutting extension 52A, 52B, 52C, 52D, 52E. Each cutting extension 52A, 52B, 52C, 52D, 52E has a width that is about one fifth the width of the tooth body 20. The third group first tooth cutting extension 52A is centrally disposed over the bandsaw body centerline 16. The third group second tooth cutting extension 52B is disposed with one outer side 29 aligned with one outer edge 28 of the third group first tooth cutting extension 52A. The third group third tooth cutting extension 52B is disposed with one outer side 28 aligned with the outer edge 29 of the third group first tooth cutting extension 52A which is not aligned with the third group second tooth cutting extension 52B outer edge. The third group fourth tooth cutting extension 52D has outer edges 28, 29 that are aligned with the outer edge of the tooth body 20 and with the second tooth cutting extension 52B outer edge 28 respectively. The third group fifth tooth cutting extension 52E has outer edges 28, 29 that are aligned with the outer edge of the tooth body 20 and with the third tooth cutting extension 52C outer edge 29 respectively.

In operation, a bandsaw blade 10 having teeth 18 configured in groups such as the second group 40 or the third group 50 cut a workpiece in a similar manner as described above. That is, each cutting extension 42A–42D or 52A–52E in the group of teeth 40, 50 cuts a portion of the channel while a different cutting extension 42A–42D or 52A–52E in the group of teeth 40, 50 cuts the adjacent portion of the channel. Because each tooth in the group 40, 50 has a cutting extension 42A–42D or 52A–52E with a generally similar size, the cutting load is evenly distributed over the group of teeth 40, 50. Of course, the number of teeth 18 in a group may be increased or decreased so long as the width of the cutting extension 26 on the tooth body 20 is the about the width of the tooth body 20 divided by the number of teeth in the group. Additionally, a bandsaw blade 10 may have more than one grouping of teeth on a bandsaw blade 10. That is, the bandsaw blade may have a group 20 of three teeth 18 followed by a group 50 of five teeth 18 or any other combination of groupings.

Alternatively, the teeth 20 may have more than one extension 26 disposed thereon. So long as the total width of the extensions 26 on a single tooth body 20 is about equivalent to the width of the extensions 26 on the other teeth 18 in the group, the cutting load will be evenly distributed. In this embodiment, the sum of the widths of the extension on a tooth are about equal to the width of the tooth body 20 divided by the number of teeth 18 in the group. Thus, expressed mathematically, where W represents the width of the tooth body, "n" represents the number of cutting teeth 17 in a group, $w_k$ represents the width of the cutting extension 26, and k represents the number of cutting extensions with a width $w_k$.

$$W = \sum_{n=1}^{\infty} w_n k_n$$

Figure 7A:
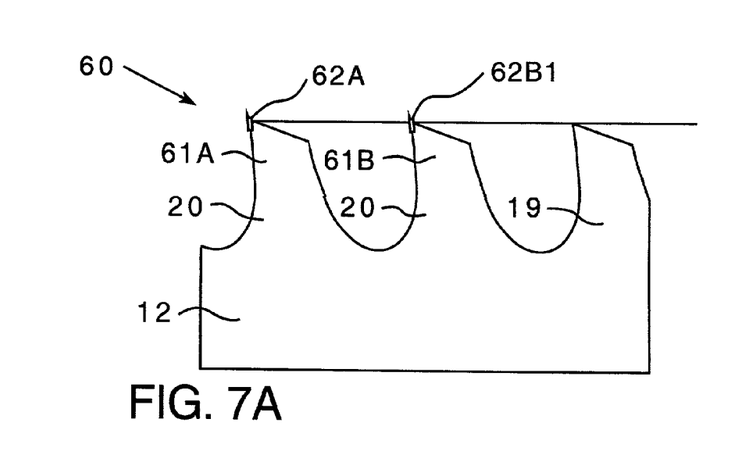
FIG. 7A is a side view of an alternate embodiment including a raker tooth.
Figure 7B:
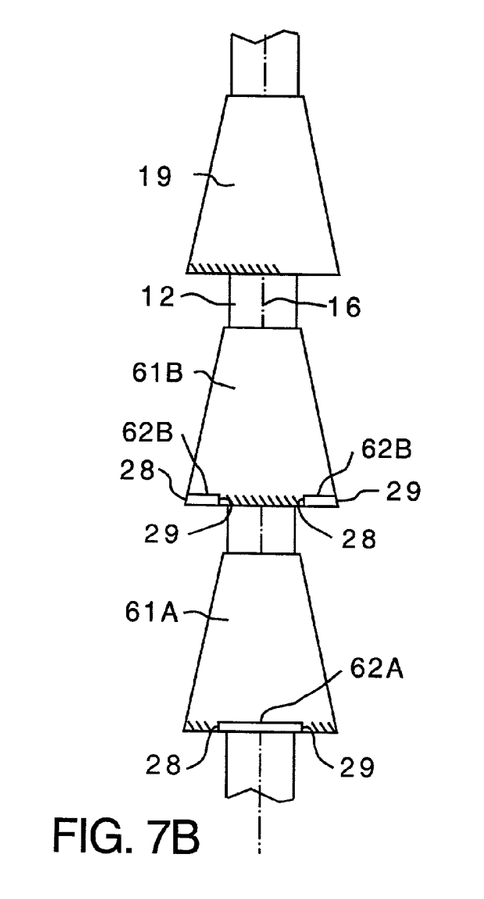
FIG. 7B is a top view of the bandsaw blade in FIG. 7A.
Figure 7C:
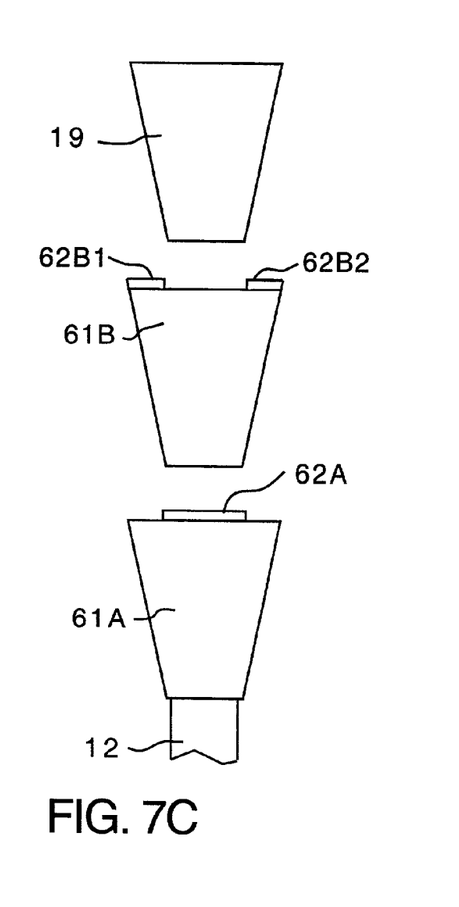
FIG. 7C is a schematic front view of the in FIG. 7A.

For example, as shown in FIGS. 7A–7C, a bandsaw blade 10 has a fourth group 60 of two cutting teeth 61A, 61B. Each cutting tooth 61A, 61B has one or more cutting extensions 62A, 62B1, 62B2. The bandsaw blade 10 also has a rake tooth 19 which does not have an extension 26. The sum of the widths of the extensions 62A, 62B1, 62B2 on each cutting tooth 61A, 61B will be ½ of the tooth width, "W". As shown, the fourth group first tooth 61 A has a single extension 62A. The fourth group first tooth extension 62A is disposed, generally, over the blade body centerline 16. The extension 62A is one half the width of the tooth body 20. The fourth group second tooth 61B has a first extension 62B1 and a second extension 62B2. Each fourth group second tooth extension 62B1, 62B2 is about one fourth the width of the tooth body 20. Thus, the sum of the widths of the fourth group second tooth extensions 62B1, 62B2, (¼+¼=½) is about one half the width of the tooth body 20. The fourth group second tooth extensions 62B1, 62B2 are disposed so that one outer side 28, 29 is aligned with the outer side of the tooth, and the other outer side 28, 29 is aligned with an outer side 28, 29 of the fourth group first tooth extension 62A. As such, the extensions 62A, 62B1, 62B2 on each cutting tooth 61A, 61B cut about one half the channel in the workpiece. Thus, each cutting tooth 61A, 61B carries about half the cutting load. This embodiment may be practiced with groups having more than two teeth. For example, a group of three teeth 20 where the first tooth has a centrally located extension 26 with a width that is one third the width of the tooth body 20 and where the first tooth in the group is followed by two teeth each having two extensions 26 that are each one sixth the width of the tooth body 20.

Figure 8A:
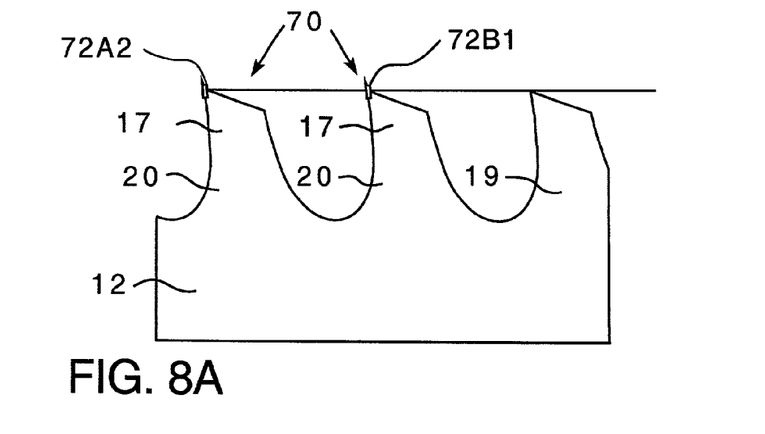
FIG. 8A is a side view of an alternate embodiment including a raker tooth.
Figure 8B:
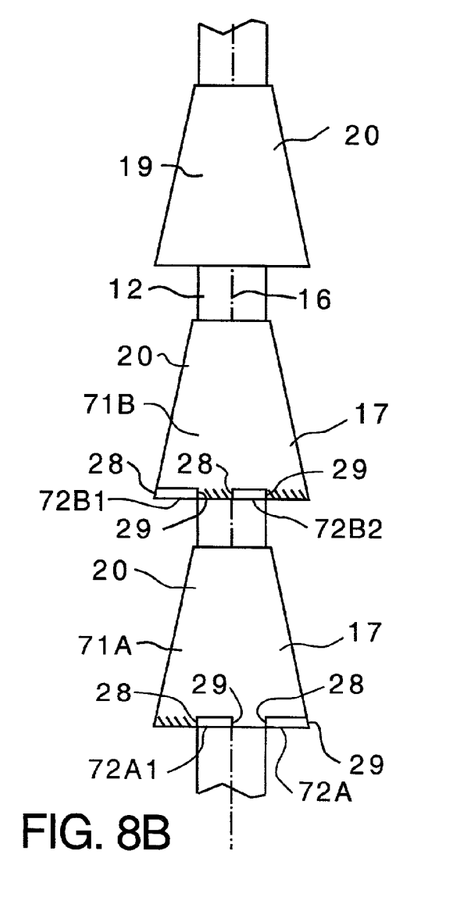
FIG. 8B is a top view of the bandsaw blade in FIG. 8A.
Figure 8C:
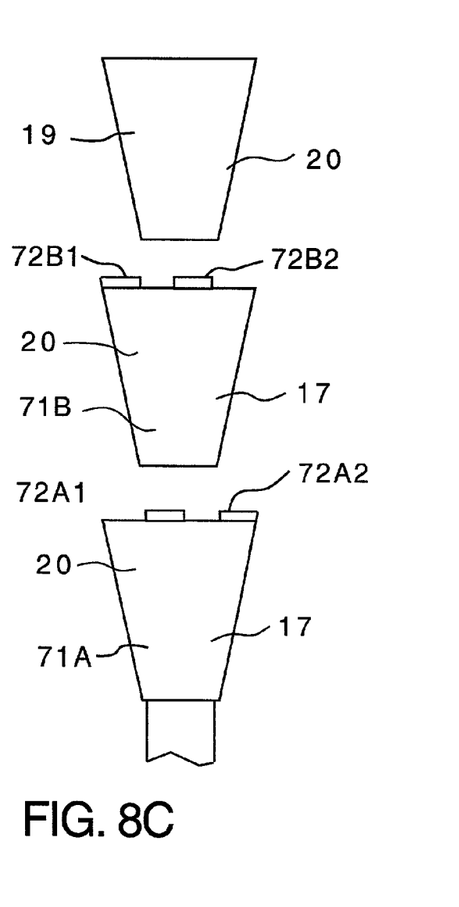
FIG. 8C is a schematic front view of the in FIG. 8A.

The alternate embodiment may also be practiced as shown in FIGS. 8A–8C, wherein there is a fifth group 70 of two teeth including a first tooth 71A and a second tooth 71B. Again, the group of teeth may be followed by a raker tooth 19. The fifth group first tooth has two extensions 72A1, 72A2. Each fifth group first tooth extension 72A1, 72A2 has a width that is about one quarter of the width of the tooth body 20. The fifth group second tooth 71B also has two extensions 72B1, 72B2. Each fifth group second tooth extension 72B1, 72B2 has a width that is about one quarter of the width of the tooth body 20. Thus, the sum of the widths of the extensions 72A1, 72A2 or 72B1, 72B2 on each tooth 71A, 71B (¼W+¼W=½W) is equal to the width of the tooth body 20 divided by the number of teeth in the group. Again, no substantial portion of any extension 72A1, 72A2, 72B11, 72B2 will be aligned with another extension 72A1, 72A2, 72B11, 72B2 in the group. Thus, the outer sides 28, 29 of the fifth group first tooth extensions 72A1, 72A2 are substantially aligned with the outer sides 28, 29 of the fifth group second tooth extensions 72B1, 72B2 or with the outer sides of the tooth body 20. Similarly, the outer sides 28, 29 of the fifth group second tooth extensions 72B1, 72B2 are substantially aligned with the outer sides 28, 29 of the fifth group first tooth extensions 72A1, 72A2 or with the outer sides of the tooth body 20. Again, this embodiment may be practiced with groups having more than two teeth so that each extension is smaller than a fourth of the width of the tooth body 20.

Additionally, any group, or combination of groups, of teeth 30, 40, 50, 60 may include, or be separated by, one or more rake teeth 19. A rake tooth 19 does not have a cutting extension 26. The rake tooth 19 will remove chips of the workpiece, cut by the cutting teeth 17, from the channel. A rake tooth 19 does not carry a cutting load.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A saw blade comprising:
 a bandsaw body having a centerline;
 a plurality of unset teeth disposed on said band body, each tooth having a body with two outer sides defining a width, and a uniform height;
 at least some of said teeth having a cutting extension extending above said tooth body height;
 each said cutting extension having two outer sides, said two outer sides defining the width of said extension;
 said teeth are disposed on said bandsaw body in groups;
 wherein, within each said group, each tooth having a cutting extension does not have a portion of the cutting extension substantially overlapping with another cutting extension in the group; and
 wherein within each said group, the sum of the widths of said cutting extensions is about equal to the width of the teeth bodies.

2. The saw blade of claim 1, wherein within a said group of teeth, each said cutting extension being generally about the same width.

3. The saw blade of claim 1, wherein within a said group of teeth, each said cutting extension outer side generally aligns with the outer side of the tooth body or with the outer side of an extension on another tooth within the group.

4. The saw blade of claim 3, wherein:
 each said group of teeth includes a plurality of cutting teeth; and
 each said cutting tooth having a cutting extension.

5. The saw blade of claim 4, wherein:
 said group has three cutting teeth including a first tooth, a second tooth and a third tooth;
 each said cutting tooth having a cutting extension with a width that is about one third the width of each said tooth body;
 said first tooth cutting extension disposed generally over said bandsaw body centerline;
 said second tooth cutting extension disposed to one side of said first tooth cutting extension and said second tooth cutting extension having an outer side aligned with the outer side of said tooth body and an outer side aligned with an outer side of said first tooth cutting extension; and
 said third tooth cutting extension disposed to the side of said first tooth cutting extension opposite said second tooth cutting extension and said third tooth cutting extension having an outer side aligned with the outer side of said tooth body and an outer side aligned with an outer side of said first tooth cutting extension.

6. The saw blade of claim 5, wherein said group having three cutting teeth includes a fourth tooth that is a raker tooth.

7. The saw blade of claim 4, wherein:
said group has four cutting teeth including a first tooth, a second tooth, a third tooth, and a fourth tooth;
each said cutting tooth having a cutting extension with a width that is about one fourth the width of each said tooth body;
said first tooth cutting extension disposed with one outer side aligned with said bandsaw body centerline and said extension extending toward one tooth body outer side;
said second tooth cutting extension disposed with one outer side aligned with said bandsaw body centerline and said extension extending toward the tooth body outer side opposite the tooth body side aid first cutting extension extends toward;
said third tooth cutting extension having an outer side aligned with the one outer side of said tooth body and an outer side aligned with an outer side of said first tooth cutting extension; and
said fourth tooth cutting extension having an outer side aligned with the outer side of said tooth body opposite the tooth body outer side aligned with said third tooth cutting extension, and an outer side aligned with an outer side of said second tooth cutting extension.

8. The saw blade of claim 7, wherein said group having four cutting teeth includes a fifth tooth that is a raker tooth.

9. The saw blade of claim 4, wherein:
said group has five cutting teeth including a first tooth, a second tooth, a third tooth, a fourth tooth and a fifth tooth;
each said cutting tooth having a cutting extension with a width that is about one fifth the width of each said tooth body;
said first tooth cutting extension disposed generally over said bandsaw body centerline;
said second tooth cutting extension disposed to one side of said first tooth and said second tooth cutting extension having an outer side aligned with an outer side of said first tooth cutting extension;
said third tooth cutting extension disposed to the side of said first tooth opposite said second tooth cutting extension and said third tooth cutting extension has an outer side aligned with an outer side of said first tooth cutting extension;
said fourth tooth cutting extension disposed to one side of said second tooth cutting extension and said second tooth cutting extension having an outer side aligned with the outer side of said tooth body and an outer side aligned with an outer side of said second tooth cutting extension; and
said fifth tooth cutting extension disposed to the side of said third tooth cutting extension and said fifth tooth cutting extension having an outer side aligned with the outer side of said tooth body and an outer side aligned with an outer side of said third tooth cutting extension.

10. The saw blade of claim 9, wherein said group having five cutting teeth includes a fifth tooth that is a raker tooth.

11. The saw blade of claim 1 wherein:
one or more groups have a different number of teeth than other said groups.

12. The saw blade of claim 11 wherein at least two groups are separated by a raker tooth.

13. The saw blade of claim 12, wherein within a said group of teeth, each said cutting extension outer side generally aligns with the outer side of the tooth body or with the outer side of an extension on another tooth within the group.

14. A saw blade comprising:
a bandsaw body having a centerline;
a plurality of unset teeth disposed on said band body, each tooth having a body with two outer sides defining a width, and a uniform height;
at least some of said teeth having at least one cutting extension extending above said tooth body height;
each said cutting extension having two outer sides, said two outer sides defining the width of said extension;
said teeth are disposed on said bandsaw body in groups;
wherein, within each said group, each tooth in a group having a cutting extension which does not have a portion of the cutting extension substantially overlapping with another cutting extension in the group; and
wherein within a said group of teeth, each said cutting extension outer side generally aligns with the outer side of the tooth body or with an outer side of an extension on another tooth within the group;
each said group of teeth includes a plurality of cutting teeth;
each said cutting tooth having one or more cutting extensions; and
wherein the sum of the widths of said one or more cutting extensions on each tooth having cutting extensions is about equal to the width of the tooth body divided by the number of cutting teeth in the group.

15. The saw blade of claim 14, wherein within a said group of teeth, each said cutting extension about the same width.

16. The saw blade of claim 14, wherein:
said group has two cutting teeth including a first cutting tooth and a second cutting tooth;
each said cutting tooth having one or more cutting extensions with sum of widths that is about one half the width of each said tooth body;
said first tooth having one cutting extension disposed generally over said bandsaw body centerline;
said second tooth having a first cutting extension and a second cutting extension, each second tooth cutting extension having a width that is about one fourth the width of the tooth body;
said second tooth first cutting extension disposed to one side of said first tooth cutting extension and said second tooth first cutting extension having an outer side aligned with the outer side of said tooth body and an outer side aligned with an outer side of said first tooth cutting extension; and
said second tooth second cutting extension disposed to the side of said first tooth cutting extension opposite said second tooth first cutting extension and said second tooth second tooth cutting extension having an outer side aligned with the outer side of said tooth body and an outer side aligned with an outer side of said first tooth cutting extension.

17. The saw blade of claim 16, wherein said group having two cutting teeth includes a third tooth that is a raker tooth.

* * * * *

UNITED STATES PATENT AND TRADEMARK OFFICE
CERTIFICATE OF CORRECTION

PATENT NO.        : 7,036,417 B2
APPLICATION NO. : 10/008,820
DATED             : May 2, 2006
INVENTOR(S)       : William George Alton Page 1 of 1

It is certified that error appears in the above-identified patent and that said Letters Patent is hereby corrected as shown below:

Col. 2, line 49, "Ad" should read --An--.

Col. 2, line 53, "a" should read --are--.

Col. 2, line 66, "lcated" should read --located--.

Col. 3, line 33, after "extensions in" insert --a--.

Col. 3, lines 39-41, 45 and 49, after "of the" insert --bandsaw blade--.

Col. 6, line 47, after "body 20 is" delete "the".

Col. 7, line 14, "61 A" should read --61A--.

Col. 7, lines 53 and 54, "72B11" should read --72B1--.

Col. 9, line 14, "aid" should read --said--.

Col. 10, line 38, insert --the-- after "with".

Signed and Sealed this

Fifteenth Day of August, 2006

JON W. DUDAS
*Director of the United States Patent and Trademark Office*